United States Patent [19]

Tanaka et al.

[11] 4,306,824
[45] Dec. 22, 1981

[54] BLIND RIVET

[75] Inventors: Toshie Tanaka, Machida; Kunio Hara, Kawasaki, both of Japan

[73] Assignee: Nifco Inc., Yokohama, Japan

[21] Appl. No.: 16,649

[22] Filed: Mar. 1, 1979

[30] Foreign Application Priority Data

Mar. 3, 1978 [JP] Japan .............................. 53-26332[U]

[51] Int. Cl.³ ......................... F16B 13/06; F16B 13/14
[52] U.S. Cl. .......................................... 411/34; 411/57; 411/70
[58] Field of Search .......................... 85/70, 71, 73–78, 85/80, 82–84; 24/73 A, 73 P, 73 D, 73 PF, 73 SM

[56] References Cited

U.S. PATENT DOCUMENTS 3,974,735  8/1976  Berner ................................ 85/76 X

FOREIGN PATENT DOCUMENTS 534433  1/1955  Belgium ................................ 85/77
859340  6/1940  France ................................. 85/76
2302442  9/1976  France ................................. 85/71

Primary Examiner—William E. Lyddane
Attorney, Agent, or Firm—J. R. Halvorsen; T. W. Buckman

[57] ABSTRACT

A blind rivet comprising a shank and a rivet body enclosing the shank, the rivet body containing in the cylindrical wall thereof wedge means and windows possessing spaces for admitting the wedge means such that, when the blind rivet is inserted through holes perforated in advance in the panels to be joined therewith and, subsequently, the shank is slid up the interior of the rivet body, the cylindrical wall of the rivet body is bent outwardly in the radial direction and, at the same time, the wedge means are raised and forced into the spaces of the windows, causing the cylindrical wall of the rivet body to be brought into tight contact with the edges of the holes in the panels and consequently enabling the blind rivet to be secured to the panels.

3 Claims, 11 Drawing Figures

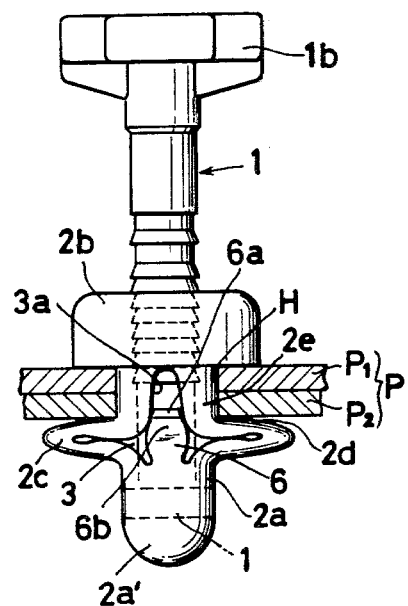
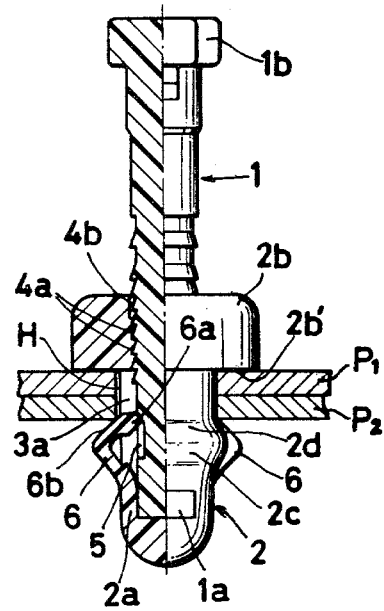
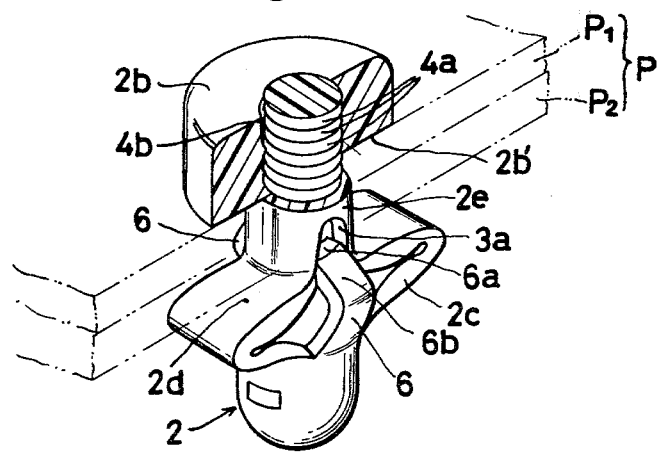

BLIND RIVET

BACKGROUND OF THE INVENTION

This invention relates to a blind rivet of the class so constructed that when the blind rivet is inserted through a fitting hole or fitting holes perforated in advance in one or more plate-shaped parts and the shank of the blind rivet which protrudes from one outer surface of the part is slid up the interior of the rivet body, the portion of the rivet body which protrudes from the opposite outer surface of the part is bent outwardly in the radial direction to the extent of securing the blind rivet fast of the part or uniting the two or more parts to one another, with ample allowance made for the size of the fitting holes perforated in the parts.

Various blind rivets of this class have been developed to date. In the light of the basic function these blind rivets are to fulfil in securing themselves in position relative to given parts or uniting such given parts to one another, however, those made of plastic materials prove to be advantageous over those made of other materials. Generally, the blind rivet of this class have a common basic construction which comprises a shank and a cylindrical rivet body formed round the shank by the two-stage plastic molding technique. Such a blind rivet is inserted through fitting holes perforated such as in panels until the flange or head of the rivet body thereof collides into the surface adjacent the edge of the fitting holes of the panels. Then, the shank alone is pulled up the interior of the rivet body with the aid of a tool. The pull of the shank causes the portion of the rivet body protruding from the other side of the panels to be bent outwardly and pressed against the panels, enabling the panels to be squeezed between the head and the bent portion of the rivet body.

Although these conventional blind rivets produce a force with which a plurality of panels will be pressed against each other, the stability with which these panels are secured to each other is insufficient unless the size of the fitting holes perforated in the panels and that of the shanks of the blind rivets inserted therethrough are substantially complimentary. If this tolerance is not controlled, the panels may possibly slip sidewise over each other and the blind rivets may possibly fail to give ample water-tightness to the fitting holes.

An object of the present invention is to provide a blind rivet of a plastic material which makes ample allowance for variations in the thickness of panels and the size of the fitting holes perforated in such panels; produces a strong force for holding the panels fast in position; provides high water-tightness to the fitting holes and manifests its effect to full advantage.

SUMMARY OF THE INVENTION

To accomplish the object described above according to the present invention, there is provided a blind rivet which comprises a shank or mandrel and a rivet body disposed round the shank and provided in the cylindrical wall thereof with at least one pair of windows, at least one of which windows is provided with wedge means extending from the lower side toward the upper side of the window and with a limited space formed in the upper side of the window for admitting forced entry of the wedge means.

For union of given panels, the shank and the rivet body of the blind rivet formed in a unitary construction is inserted from one side through the fitting holes perforated in advance in the panels and subsequently the shank is pulled up the interior of the rivet body. By the pull of the shank, the portion of rivet body which protrudes from the other side of the panels is bent outwardly and pressed against the panels, causing the panels to be held fast in position. At the same time, the wedge means in the window of the rivet body is raised and forced into the narrower limited space and, consequently, the portion of the cylindrical wall of the rivet body which is adjacent to the aforementioned space is bent outwardly in the radial direction and pressed tightly against the fitting holes formed in the panels when the wedge is forced into said space, thus making ample allowance for variations in the size of the fitting holes in the panels and for the thickness of the panels as well. Since the blind rivet is made of a synthetic resin and always exerts an elastic pressure on the panels, it manifests an outstanding effect of producing high strength for holding the panels in position and providing high water-tightness to the fitting holes perforated in the panels.

BRIEF DESCRIPTION OF THE DRAWINGS

FIG. 7 is a front view of the same blind rivet in a state assumed after completion of its attachment to the panels;

FIG. 8 is a half-sectioned side view of the blind rivet of FIG. 7, observed as turned by 90° relative to the orientation of FIG. 7; and FIG. 9 is a partially cutaway perspective view of the blind rivet in a state subsequent to completion of the attachment to the panels, shown in phantom.

DETAILED DESCRIPTION OF THE INVENTION

This invention relates to a blind rivet which comprises a shank or mandrel and a rivet body disposed round the shank such that an upward pull of the shank relative to the rivet body causes given panels or other similar parts in which the rivet is inserted to be powerfully bound to each other.

Figure 1A:
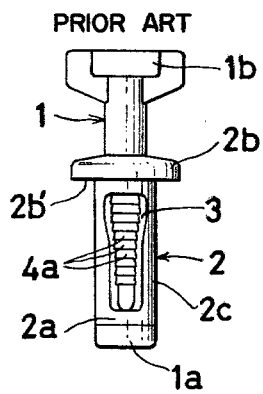
FIGS. 1(A), 1(B) and 1(C) are a front view of a typical conventional blind rivet with respect to which the present invention aims to provide improvements, a side view of the blind rivet and a longitudinally sectioned view of the blind rivet in a state of use.
Figure 1B:
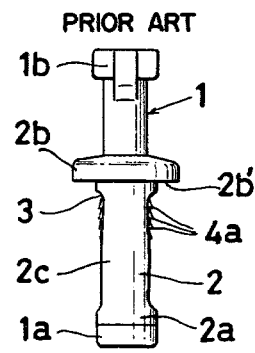

A good many blind rivets of this class have heretofore been developed. Particularly, the blind rivet shown in FIGS. 1(A)–1(C) which has been proposed by inventors of the common assignee of this invention excels all the others in respect of the function of providing fast attachment to panels, function of permitting fast union of panels and allowance made for tolerance variations in the diameter of fitting holes and the thickness of panels around the filling holes. To describe this particular blind rivet briefly, a rivet body is disposed to a suitable length in the longitudinal direction around a shank 1, with the lower portion or lower end 2a of the rivet body fastened to the lower portion or lower end 1a of the shank. The rivet body is provided at the upper end thereof with a head portion 2b adapted to come into intimate contact with the area of panels P surrounding the fitting holes H when the rivet body is received in the fitting holes. Generally this blind rivet has not only the rivet body 2 but also the shank 1 thereof made of a synthetic resin by the so-called two-stage plastic molding technique involving the steps of first molding the shank, placing the formed shank in the cavity of the second metal die for the rivet body and subsequently injection molding the rivet round the shank within the cavity. In the molding of the rivet body, windows 3 are formed in the cylindrical wall 2c of the rivet body.

Figure 1C:
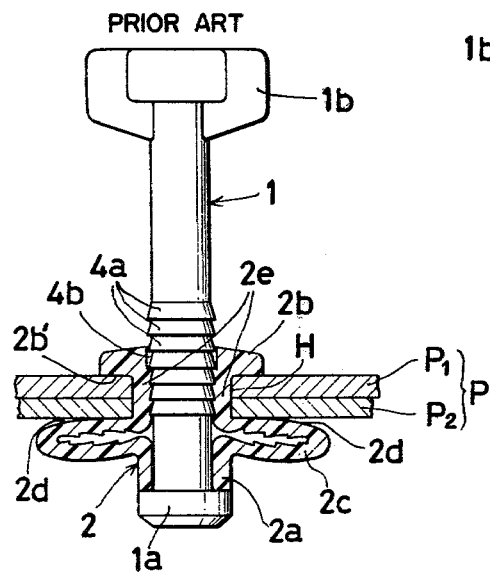

The blind rivet thus obtained is put to use by inserting the rivet body 2 into the holes H with the lower end thereof in the lead, pressing the head portion 2b of the rivet body against one surface of the panels P and raising the shank 1 relative to the rivet body as by pulling the head portion 1b with the aid of a special tool (not shown) designed exclusively for the purpose. Consequently, the lower end 1a of the shank moves up and imparts compressive force to the cylindrical wall 2c of the rivet body via the lower end 2a of the rivet body which is fastened to the aforementioned lower end 1a, with the result that the cylindrical wall 2c is bent outwardly owing to the presence of the windows 3 and eventually folded over itself and spread out and pressed against the surface of the panels surrounding the fitting holes on the opposite side as illustrated in FIG. 1C. As a result, the panels P are squeezed between the surface 2d of the cylindrical wall of the rivet body expanded and brought into contact with the panels and the surface 2b' of the head portion 2b of the rivet body held in intimate contact with the panels. The force with which the panels are squeezed serves to keep the blind rivet attached fast to the panels. When the part P given to be fastened happens to comprise a plurality of components such as two panels $P_1$, $P_2$ as illustrated, the force serves to keep the two panels in fast union. Thereafter, the portion of the shank which protrudes from the rivet body and serves no further purpose is generally cut off.

This blind rivet excels others by the fact that since the cylindrical wall 2c of the rivet body is allowed to spread wide in the radial direction, the fastening force produced by the blind rivet is not appreciably varied even by a considerable change in the diameter of the fitting holes H insofar as the head portion 2b of the rivet body has a fair size, and the fact that the blind rivet makes ample allowance for possible change in the thickness of the panels around the fitting holes because the portion of the cylindrical wall of the rivet body which is folded over itself by the pull of the shank is proportionally changed.

When at least the rivet body of the blind rivet is made of a synthetic resin and a row of toothed steps 4a is provided on the shank 1 and at least one complementary catch means 4b is provided on the inner wall of the rivet body so that the toothed steps 4a and the catch means 4b are brought into checked engagement after completion of the fastening of the blind rivet, the desired fastening of the blind rivet to the panels can be obtained simply by discontinuing the pull of the shank 1 at a desired point and the force which the rivet body produces by virtue of its own resiliency in the direction of resuming its original shape is utilized for enhancing the force serving to keep the two engaging means in checked engagement so as to maintain the binding force of the blind rivet always to a slight excess. Owing to the special effects described above, this particular blind rivet having the rivet body made of a synthetic resin finds favorable acceptance for the purpose of providing fast union of given panels. Further, with the head portion of the rivet body molded in a suitable shape, the blind rivet is extensively used for the purpose of attachment of panels.

No matter whether the rivet body is made of a synthetic resin or a metallic material capable of plastic deformation, the blind rivet still entails common potential faults. The rather poor resistance the blind rivet offers to shear stress exerted in the lateral direction forms one such fault.

For the blind rivet to withstand the lateral stress successfully, it is important that the portion 2e of the rivet body positioned inside the fitting holes H (hereinafter referred to simply as "the enclosed portion 2e") possesses a force causing itself to expand in the radial direction and come into pressed contact with the inner wall surface of the fitting holes, desirably throughout the entire circumference of the holes. In the blind rivet described above, because of the presence of the windows formed in the rivet body for the purpose of satisfying the essential function of permitting the radial expansion of the cylindrical wall of the rivet body, the surface area of the cylindrical wall of the rivet body is decreased and, from the functional point of view, the compressive force produced by the lower end 1a of the shank is preponderantly divided into the force causing the cylindrical wall of the rivet body to be bent out and folded over itself and the force consequently causing the enclosed portion 2e of the rivet body to be drawn in the axial direction. Thus, the compressive force does not directly work to expand the enclosed portion 2e in the radial direction inside the fitting holes. Indirectly, the radial expansion of the enclosed portion 2e relies solely upon the force with which the folded portion of the cylindrical wall of the rivet body tends to spread outwardly.

By this reason, the blind rivet does not completely suit uses wherein it is expected to provide thorough resistance particularly to lateral shear stress. Especially when this blind rivet is used for binding two panels $P_1$, $P_2$, for example, there is a possibility that it will fail to keep the two panels in tight enough union to prevent them from slipping sidewise over each other under the influence of lateral stress applied only on one of the two panels.

Now from a different angle, if the blind rivet is expected to make more allowance for the thickness of panels to be bound therewith and provide sufficient binding force even for panels of a small thickness, the windows 3 naturally are required to have a proportionally increased length. When this blind rivet is used on panels of a relatively large thickness, therefore, the general portion of the upper end of the windows 3 enters more or less the enclosed portion 2e of the cylindrical wall of the rivet body in the fitting holes of the panels. There consequently ensues a fair possibility that the route extending through the interior of the rivet body to the head portion 2b will fail to enjoy sufficient water-tightness because of the partial entry of the windows into the enclosed portion 2e.

The present invention has been conceived with a view to overcoming the disadvantage suffered by the aforementioned blind rivet. Specifically, this invention provides a blind rivet which retains intact the advantageous effect derived by the conventional blind rivet from the deformation of the rivet body and incorporates an improved function of causing the enclosed portion 2e to be positively expanded in the radial direction within the fitting holes of the panels, whereby the blind rivet provides enhanced binding force for panels, offers increased resistance to the lateral shear stress possibly exerted upon the interface between the panels and, if necessary, imparts a substantially high water-tightness to the enclosed portion 2e within the fitting holes of the panels and, consequently, permits an additional increase to the already enhanced binding force.

Now the present invention will be described in detail with reference to the preferred embodiments illustrated in the accompanying drawing. In these preferred embodiments, the idea underlying the present invention is manifested more in a blind rivet of synthetic resin than a blind rivet of a metallic material, because the former is advantageous over the latter due solely to the phenomenon of plastic deformation as already touched upon. As will be seen from the description to be given afterward, the blind rivet of metallic material can enjoy an effect of its own.

Figure 2:
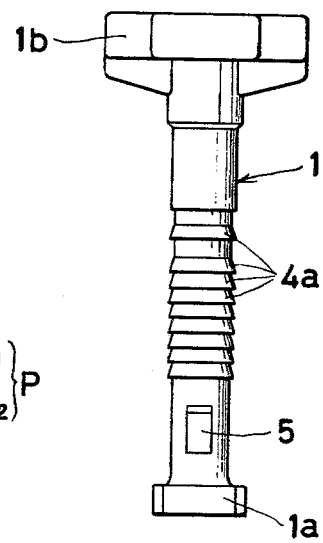
FIG. 2 is a front view of a shank to be used in one preferred embodiment of the blind rivet of the present invention.

As the first step, a shank 1, as illustrated in FIG. 2, is molded in a first metal die. It may be formed in any of the shapes expected to be possessed by blind rivets of this class. In FIG. 2, therefore, the parts of the shank which correspond to those of the shank component of the blind rivet illustrated in FIG. 1 are designated by like symbols. From the standpoint of this actual embodiment, an indentation or recess 5 is formed by scraping out a portion of the peripheral surface close to the lower end 1a of the shank. This indentation 5 will be described afterward.

Figure 3:
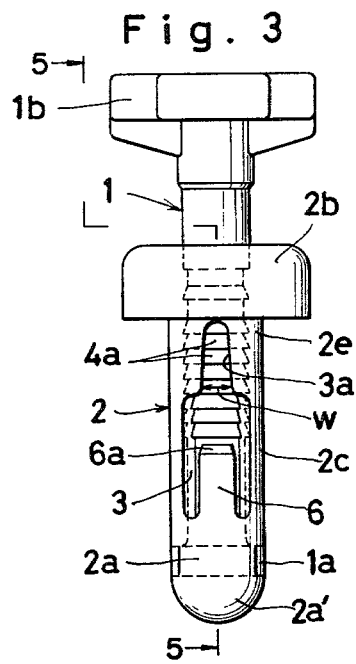
FIG. 3 is a front view of one preferred embodiment using therein the shank illustrated in FIG. 2.
Figure 4:
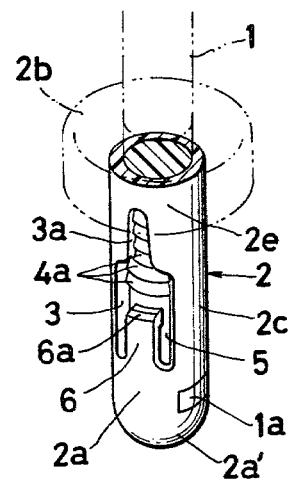
FIG. 4 is a perspective view of the blind rivet of FIG. 3, with the portion thereof from the head portion of the rivet body upward cut off.
Figure 5:
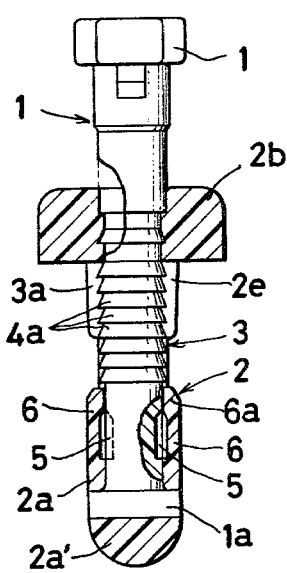
FIG. 5 is a longitudinal side view in partial section of FIG. 3 taken along line 5—5.

Subsequently, a rivet body 2, as seen in FIGS. 3-5, is formed around the shank 1 such as by the two-stage plastic molding technique, with a part 2a of the lower portion fastened to a part of the lower portion of the shank, specifically the lower end 1a in the present case. At the same time, windows 3 are formed in the cylindrical wall 2c of the rivet body. The formation of these windows 3 may be effected in the same way as in the conventional blind rivets. In the blind rivet of the present preferred embodiment, the lowermost tip 2a' of the lower end of the rivet body has a bulbous shape, however, this bulbous shape of the lowermost tip 2a' has no particular significance. This tip 2a' can be designed in any shape.

The characteristic improvement aimed at by the present invention is attained by providing at least one of the windows 3 (usually a pair of windows opposed to each other; three or four windows where the cylindrical wall of the rivet body is adapted to expand in three or four directions respectively) with wedge means 6. In the case of the preferred embodiments illustrated in FIGS. 2-9, the lower end of each of the pair of windows 3, 3 includes an arm extended to a suitable length toward the upper end to form wedge means 6. On the other hand, a wedge receiving portion 3a disposed in the upper portion of the window at least close to the head portion 2b of the rivet body and within the enclosed portion 2e of which is destined to be retained within the fitting holes of panels has a limited width adequate to permit forced entry of the wedge means 6. In the present preferred embodiment, under the conditions described above and from the practical point of view, the leading end 6a of the wedge means 6 is formed in a tapered shape to facilitate its initial penetration into the space formed by the narrowed portion of the window or the wedge receiving portion designated 3a and with the width, W, of the spatial opening of the wedge receiving portion 3a being slightly diverged in the direction of the entrance at the lowermost end of the opening to enable the opening to expand effectively in proportion to the length to which the wedge means is allowed to enter the wedge receiving portion 3a, smoothen the entry of the wedge means into the wedge receiving portion 3a and consequently enable the wedge means to fulfil its inherent function. Thus, the wedge receiving portion 3a is formed so as to converge gradually toward its closed end. Further in this case, the wedge means 6 is expected to exhibit positive flexibility by virtue of its resilience. The leading end 6a of the wedge means 6 and the entrance to the wedge receiving portion 3a are properly separated from each other. The design basis for the determination of the distance thus interposed therebetween, it is believed, will automatically become apparent from the knowledge of the function of the present invention to be described hereinafter.

Here, the process through which the blind rivet is fastened to given panels will be described on the assumption that, in this blind rivet, a proper distance is interposed between the leading end 6a of the wedge means 6 and the entrance to the wedge receiving portion 3a. In much the same way as with any of the blind rivets of this kind, the rivet body 2 is telescoped inside the fitting hole H of the panel P, and when the head portion 2b of the rivet body is pressed against the surface of panel P adjacent the edge of the fitting hole H the shank 1 is then pulled upwardly. At first, the cylindrical wall 2c of the rivet body bulges out in the shape of a beer barrel. As the shank 1 is further pulled upward, the cylindrical wall 2c of the rivet body begins to bend outwardly, about which time the leading end 6a of the wedge means 6 extended from the lower end of the window begins to rise in conjunction with the shank 1 and the rivet body 2 fits into the entrance of the wedge receiving space 3a, see FIG. 6.

As the upward pull of the shank 1 is further continued, basically in the same way as in the blind rivet touched upon in the early part of the text, the cylindrical wall 2c of the rivet body is bent outwardly. Eventually, one side of the panel P is pressed down by the lower surface 2b' of the head portion 2b and the other side of the panel is pressed up by the surface 2d of the outwardly bent portion of the cylindrical wall so that the panel is held fast in position therebetween, as illustrated in FIG. 7. At the same time, the wedge means 6 peculiar to the present invention advances from the state illustrated in FIG. 6 and forces its way into the wedge receiving portion 3a toward the bottom of the recess formed by space 3a. Eventually, the wedge portion assumes a state amply driven into the opening as illustrated in FIG. 7. Consequently, the upper portion 2e adjacent head 2b is positioned inside the fitting hole H and is subjected positively to the force exerted thereon in the radial direction by expanding wedge 6, with the result that the upper portion 2e is forcibly opened outwardly and pressed against the inner wall of the hole H. The enclosed upper portion 2e, therefore, acquires ample force to resist lateral shear stress as well as to curb otherwise possible play of the rivet body within the fitting hole. Further, the presence of the wedge means contributes to increasing the partial strength of the enclosed portion 2e inside the fitting hole so much as to resist the shear force tending to slip the two panels $P_1$, $P_2$ sidewise over each other. When the head portion 2a of the rivet body is modified so as to permit attachment of a given article (such as, for example, a button or a T-shaped stud), the wedge means serves the purpose of increasing the rivet's force for holding the article in position.

In the case of the present preferred embodiment, the wedge receiving portion 3a is tapered slightly as touched upon previously for the purpose of improving the wedge effect. If the wedge receiving portion 3a has a width smaller than the width of the wedge means 6, it may be formed in a rectangular shape. Conversely, the wedge means 6 may be slightly converged in the direction of its leading end as in the case of any ordinary wedge.

Figure 6:
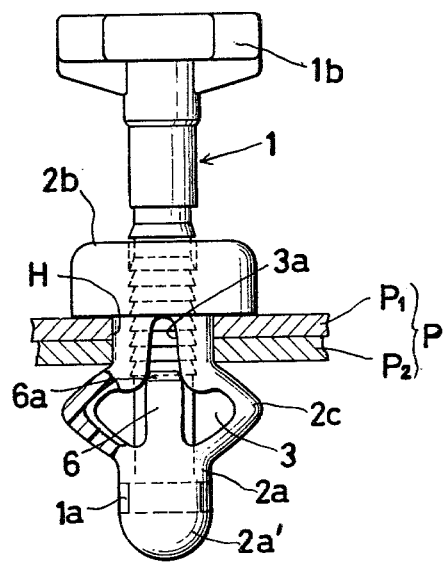
FIG. 6 is a partially cutaway front view of the blind rivet of this invention in a state about to complete its tight attachment to the panels.

Incidentally, the present preferred embodiment requires the wedge means 6 to manifest ample flexibility by virtue of its resilience as touched upon previously. The flexibility of the wedge means is intended to contribute to increase the water-tightness. After the wedge means 6 has forced its way into the wedge receiving portion 3a and has started pushing the cylindrical wall outwardly as illustrated in FIG. 6, the leading end 6a of the wedge means comes into intimate contact with the lateral wall of the wedge receiving portion and the frictional force generated in consequence of the intimate contact obstructs further upward advance of the wedge means. From this point until the final position, illustrated in FIGS. 7–9, is assumed, the compressive force applied upwardly to the wedge means causes the wedge means to be expanded outwardly in much the same way as the cylindrical wall of the rivet body is bent outwardly. As the outward deformation gains in intensity, the leading end 6a inside the wedge receiving portion 3a shifts its position as though escaping in the direction of the axis of the shank 1. Eventually the surface 6b of the wedge portion comes into contact with the edge of the opening of the fitting hole H on the side opposite to head 2b (as shown conspicuously in FIG. 8). As a result, the surface 2d of the cylindrical wall of the rivet body which is held in intimate contact with the panel surface and the surface 6b of the wedge means jointly form a continuous contact surface in the entire circumferential direction and substantially seal the entire periphery of the edge of the opening in the fitting hole on the reverse side. Of course all the plurality of windows 3(two windows in the present case) are required to be provided each with wedge means 6 and a corresponding wedge receiving portion 3a in order for the blind rivet to provide perfect water-tightness.

Alternatively, where the enhancement of the binding force of the blind rivet forms the sole requirement, the wedge means 6 need not manifest flexibility outwardly but may be made of a tough material and the desired wedge effect can be attained by having the window disposed in at least one window instead of all the plurality of windows. When the wedge means is made of a tough material, the blind rivet provides a certain degree of water-tightness insofar as the wedge means is adapted to come into intimate contact with the inner wall of the wedge receiving portion 3a of the window. In this case, the intimate contact serves to enhance the strength of the rivet as a natural consequence, whether this is intended or not. This is because such intimate contact between the lateral surface of the wedge means and the inner wall of the wedge receiving portion necessitates forced entry of the wedge member, though to a slight extent, into the wedge receiving portion and, after all, causes the enclosed portion 2e to be expanded outwardly through the medium of the lateral wall of the wedge receiving portion.

To ensure ample forced entry of the wedge means into the wedge receiving portion and sufficient radial expansion of the wedge means as in the present preferred embodiment, it is advantageous for the shank 1 to be provided with an indentation 5 for permitting insertion therein of the leading end 6a of the wedge means, so that as the leading end 6a shifts its position in the direction of the axis of the shank 1 beyond the position at which it collides into the shank 1 (with the condition of this insertion illustrated clearly in FIG. 8). If, in this case, the surface of the indentation 5 into which the leading end 6a of the wedge means collides is inclined complementarily as illustrated, the inclined surface will serve effectively as one fulcrum for the outward expansion of the wedge means when the shank 1 is lifted upwardly after the leading end 6a has entered the indentation 5.

The blind rivet of the present invention acquires enhancement of the binding force and notably improvement of the water-tightness owing to the provision of the wedge means as described above. It should be noted at this point that the presence of this wedge means does not impair at all the characteristic advantage of the blind rivet illustrated in FIG. 1 and touched upon in the early part of the text.

Possible effects upon the allowance for the panel thickness (in the peripheral area of the fitting hole) and for the diameter of the fitting hole are absorbed by the extent of the outward expansion of the cylindrical wall of the rivet body and also by the change of the position of the outward expansion. This problem does not apply to the blind rivet using a wedge means of rigid material, because the wedge means is adapted to be wholly admitted in the wedge receiving portion. In the case of the blind rivet using a wedge means made of a flexible material, such effects can be absorbed by the degree of the outward expansion of the wedge means and also by the change of the position of such outward expansion. If the blind rivet is made of a synthetic resin, complementary engaging means 4a, 4b are desirably formed on the outer surface of the shank and on the inner wall of the rivet body so as to be brought into mutual interlocked engagement. They will serve the purpose of ensuring fast retention of the binding force the blind rivet exerts upon the panels.

The distance separating the leading end 6a of the wedge means and the entrance to the wedge receiving portion 3a from each other is fixed in accordance with the ranges in which the panel thickness and the hole diameter are allowed to vary. In other words, this distance can be fixed so that the two members 6a, 3a are brought into a mutually fitting state when the shank is lifted enough for the rivet to produce desired union of given panels. This is a matter left to choice for the purpose of design.

In the illustrated preferred embodiments, the blind rivet of this invention is shown in an environment providing union of two panels $P_1$, $P_2$. Of course, it can be used for binding a greater number of panels. Similarly, the blind rivet can be used for fastening given parts to P by having the head portion of the rivet body suitably shaped, without referece to the construction of the parts P. Where the blind rivet is expected to provide improved water-tightness, it is good practice to form the head portion 2b of the rivet body in the shape of resilient frusto-conical disc, not shown.

In any event, the present invention enables the blind rivet of the class which fulfils its function by having the rivet body bent radially outwardly and folded over itself to be rendered more effective by the enhancement of the lateral stress property and the improvement of the water-tightness. Thus, the present invention has a notable effect of further broadening the range of uses found for blind rivets of this class.

I claim:

1. A blind rivet, comprising a shank provided on the outer peripheral surface thereof with a plurality of toothed steps adapted for locking engagement and a one piece headed cylindrical rivet body insert molded around the shank and provided on the inner surface thereof with toothed steps formed complementarily for locking engagement with the aforementioned toothed steps on the shank and further provided in the cylindrical wall thereof with at least a pair of opposed axially extending windows, at least one of the windows being provided with bendable wedge means extending from the lower end toward the upper end of the window and with the free end of said wedge means spaced from said upper end of the window and a restricted wedge receiving portion formed in the upper end of the window for permitting forced entry therein of the wedge means, whereby desired binding of given panels is accomplished by inserting the whole blind rivet combining the shank and the rivet body from an open side of at least one panel into a fitting hole perforated in advance in said at least one panel until the head of said body is seated on said panel and subsequently pulling the shank upwardly relative to the rivet body for thereby causing the portion of the rivet body protruding on the other side of the panels to be bent outwardly in the radial direction, and at the same time, allowing the free end of said wedge means to enter the wedge receiving portion and direct said free end radially inwardly to foreshorten said wedge means by bending radially outwardly and press itself tightly against the inner walls of the fitting holes so as to fasten the blind rivet to the panels with enhanced binding force.

2. The blind rivet according to claim 1, wherein the shank is provided on the upper end thereof with a head portion formed in a shape permitting ready engagement of a tool designed exclusively for the purpose of operating the shank.

3. The blind rivet according to claim 1, wherein the shank is provided therein with an indentation adapted to permit insertion therein of the leading end of the wedge means so that the upward pull of the shank permits ready insertion of the wedge means into the wedge receiving portion and causes the wedge means to be amply expanded outwardly.

* * * * *